United States Patent [19]

Grenthe et al.

[11] Patent Number: 5,632,824
[45] Date of Patent: May 27, 1997

[54] METHOD OF PREPARING POWDERS FOR HARD MATERIALS FROM COBALT SALTS AND SOLUBLE TUNGSTATE SALTS

[75] Inventors: Ingmar Grenthe, Österskär; Mamoun Muhammed, Djursholm; Sverker Wahlberg, Hägersten, all of Sweden

[73] Assignee: Sandvik AB, Sandviken, Sweden

[21] Appl. No.: 557,579

[22] Filed: Nov. 14, 1995

[30] Foreign Application Priority Data

Nov. 16, 1994 [SE] Sweden .................................. 9403954

[51] Int. Cl.$^6$ .................................................. B22F 9/24
[52] U.S. Cl. ...................... 148/237; 75/351; 75/361; 75/371
[58] Field of Search ........................ 75/351, 361, 365, 75/369, 371; 148/237

[56] References Cited

U.S. PATENT DOCUMENTS

| | | | |
|---|---|---|---|
| 3,440,035 | 4/1969 | Iwase et al. | 75/351 |
| 3,488,291 | 1/1970 | Hardy et al. | 75/365 |
| 5,352,269 | 10/1994 | McCandlish et al. | 75/351 |

FOREIGN PATENT DOCUMENTS

| | | | |
|---|---|---|---|
| 91-07244 | 5/1991 | WIPO | 75/351 |

*Primary Examiner*—George Wyszomierski
*Attorney, Agent, or Firm*—Burns, Doane, Swecker & Mathis, L.L.P.

[57] ABSTRACT

There is disclosed a method for preparing a powder containing ammonium salts of W+Co(Ni) complex ions, through chemical reactions, in a water solution at temperatures from 70° C. to the boiling point and at pH around neutral, between tungstate salts and cobalt (nickel) salts characterized in that said tungstate salts are the highly soluble sodium tungstate or ammonium metatungstate.

6 Claims, No Drawings

METHOD OF PREPARING POWDERS FOR HARD MATERIALS FROM COBALT SALTS AND SOLUBLE TUNGSTATE SALTS

BACKGROUND OF THE INVENTION

The presently claimed invention relates to a method of preparing fine grain WC—Co(Ni) powders for cemented carbides.

WC—Co cemented carbides are made by the powder metallurgical methods of milling a powder mixture containing powders forming the hard constituents and binder phase, pressing and sintering. The milling operation is an intensive wet milling in mills of different sizes with the aid of milling bodies. The milling time is of the order of several hours up to days. Milling is believed to be necessary in order to obtain a uniform distribution of the binder phase in the milled mixture. It is further believed, that the intensive milling increases the reactivity of the mixture which further promotes the formation of a dense structure.

Because of the long milling time, the milling bodies wear and contaminate the milled mixture which, has to be compensated for. The milling bodies can also break during milling and remain in the structure of the sintered bodies. Furthermore, even after an extended milling, a nonhomogeneous rather than an ideal homogenous mixture may be obtained. In order to ensure an even distribution of the binder phase in the sintered structure, sintering has to be performed at a higher temperature than the theoretical.

An alternative way is to start from an intimate mixture of cobalt and tungsten, which subsequently is carburized. The mixture can be obtained through the formation of a composite metal salt in a chemical process step. U.S. Pat. No. 3,440,035 discloses such a method of preparing cemented carbide powder characterized in that a suspension or solution of ammonium paratungstate (APT) in water is mixed with a nitric or hydrochloric aqueous solution of, e.g., cobalt. The mixture is neutralized with ammonium hydroxide and reacted at a temperature of from 20° to 80° C. The pH after the reaction, should be within the range 4.5–8. The resultant composite salt powder if filtered off and processed into WC—Co cemented carbide.

Our U.S. patent application Ser. No. 08/465,356 filed Jun. 5, 1995, now U.S. Pat. No. 5,594,929 discloses an easy method of preparing a powder containing WC and cobalt and/or nickel. APT powder and a powder of a basic salt of cobalt and/or nickel are mixed in water. The suspension is stirred to react at temperatures ranging from room temperature to the boiling point of the solution whereby a precipitate is formed, which precipitate is filtered off, dried and finally reduced to a metallic powder.

According to copending U.S. patent application Ser. No. 08/464,564 filed Jun. 5, 1995 (Attorney Docket No.: 024444-132), a powder containing W and Co and/or Ni can be prepared by reacting APT and a soluble salt of Co(Ni) in water at temperatures from room temperature to the boiling point of the solution keeping the solution pH at a constant level during the chemical reactions. The powder is filtered off, dried and reduced to a metallic powder which may be further carburized to form a powder containing WC and Co and/or Ni.

In our U.S. patent application Ser. No. 08/464,965, now U.S. Pat. No. 5,584,907, a method is disclosed for preparing a powder containing W and Co and/or Ni from APT and a soluble salt of Co(Ni) by a chemical reaction in a water suspension at temperatures from room temperature to the boiling point of the solution, whereafter, the formed powder is filtered off, dried and reduced to a metallic powder. The method is characterized in that additional metals from groups IVa, Va or VIa of the periodical table of the elements are added to the suspension as compounds like oxides, hydroxides, soluble or insoluble salts.

OBJECTS AND SUMMARY OF THE INVENTION

It is an object of this invention to avoid or alleviate the problems of the prior art.

It is further an object of this invention to provide a method of preparing fine grain WC—Co (Ni)-powders for cemented carbide.

The invention provides a method of preparing a powder containing tungsten and cobalt and/or nickel comprising mixing a tungsten salt taken from the group consisting of sodium tungstate, ammonium metatungstate or mixtures thereof in water, reacting the mixture at a temperature of from about 70° C. to the boiling point of the solution to form a precipitate powder of tungsten and cobalt and/or nickel and removing the precipitate from the solution.

DETAILED DESCRIPTION OF THE PREFERRED EMBODIMENTS OF THE INVENTION

The presently claimed invention relates to a chemical method of making a fine-grained intimately mixed W+Co powder precursor from tungsten starting materials other than ammonium paratungstate (APT). The process proceeds through chemical reactions between salts of cobalt and a highly soluble tungsten salt, such as sodium tungsten ($Na_2WO_4 \cdot xH_2O$) or ammonium metatungstate ($AMT, (NH_4)_6H_2W_{12}O_{40} \cdot yH_2O$). By soluble is herein meant soluble in water or in mixed solvent, e.g., water/acetonitrile or water/ethanol, at the temperatures and total concentrations used in the process at a level of at least 30%, preferably at least 3%.

A process starting from sodium tungsten is of special interest for recycling of tungsten materials by chemical methods. Tungsten scrap may be converted to sodium tungsten which can then be processed into a W—Co containing powder and further to a WC—Co material.

The cobalt source can be a soluble salt of cobalt, e.g., cobalt chloride, cobalt nitrate or cobalt acetate, in a process with sodium tungstate. With ammonium metatungstate as starting material, the cobalt salt can be either a soluble salt as above, or a basic and insoluble salt, e.g., $Co(OH)_2$, $CoCO_3$, $COC_2O_4$ or $CoCl(OH)$. The reactions take place in an aqueous solution and can, depending on the process conditions, give two slightly different Co and W containing powders as products. Both products are ammonium salts of Co+W complex ions of similar structure, tungstate oxometalates with cobalt ions inside or outside the tungstate clusters. The two salts have very different solubility in solutions. For precipitation of the least soluble pink colored salt, not more than stoichiometric amount of ammonium is needed. The salt is always formed when ammonium ions are present initially, e.g., when starting from ammonium metatungstate. Precipitation occurs as soon as the Co+W complex ion is formed in solution without any further additions of ammonium. The other salt is green colored and much more soluble. High concentrations of ammonium ions are needed to precipitate it from solution. The soluble Co+W complex ion is formed in all embodiments of the process, starting from sodium tungstate or ammonium metatungstate. Due to its high solubility, it is necessary to add extra amounts of ammonium ions preferably in the form of ammonium acetate, about 2–3 mole/liter solution, e.g., 2–3 times the amount of tungsten, to obtain the green colored powder.

The procedures differ slightly depending on the tungsten starting material used. Several process alternatives will therefore be described starting from sodium tungstate or ammonium metatungstate. Products are, in all cases, a mixture of the green and the pink powders.

In the first embodiment, sodium tungstate powder is dissolved in water. The concentration is typically within about 0.03 to 1 kg/l. The solution is heated to a temperature from 70° C. to the boiling point of the solution. The pH is adjusted to 6–8 by the addition of a suitable acid, e.g., nitric, hydrochloric or acetic acid. A soluble Co salt can be added before or after the neutralization. The solution is heated for 10 to 30 minutes to form the soluble Co+W complex ion. Ammonium acetate is added either as a solid or dissolved in a small amount of water. The solution is cooled to about 5°–25° C. to precipitate the Co+W complex as a fine green colored Co+W containing powder. The powder is purified in a recrystallization step to reduce the sodium content according to the following: the powder to be purified is dissolved in water under heating to give an intensively green colored solution. The powder is recovered by addition of ammonium acetate and cooling down to about 5°–25° C. as described above. The green powder is filtered off, dried and reduced in, e.g., a hydrogen reducing atmosphere, to a fine homogeneous metallic powder containing intimately mixed Co and W. This mixture may subsequently be carburized either by mixing with carbon or in a carbon containing gas to form a WC+Co powder with a typically submicron grain size. The powder can be mixed with a pressing agent, compacted and sintered to dense cemented carbide, usually with a submicron WC grain size. The content of Co in the final WC+Co product can be controlled and varied within 5 to 7% by varying the initial amounts of cobalt salt, sodium tungstate and ammonium acetate in accordance with conventional techniques.

In a second embodiment, sodium is removed in a more efficient way by the application of an ion exchange step. The sodium tungstate solution is converted to an ammonium tungstate solution by pumping it through a column containing an ammonium loaded cation exchange resin. The effluent solution is heated to a temperature from 70° C. to the boiling point of the solution and neutralized by the addition of acid as above. The soluble cobalt salt is added before or after the neutralization step depending on which product is desired. Addition of cobalt before the neutralization will promote the formation of the green colored powder. Addition of cobalt after the neutralization will, on the other hand, result in a higher yield of the pink colored powder. The reaction time after the cobalt addition is 10 minutes to 2 hours. The green powder is obtained through precipitation by the addition of ammonium acetate, cooling and filtration as described earlier in the first embodiment. No purification by recrystallization is required. The other product, the less soluble pink colored powder, precipitates without extra ammonium additions or cooling steps. The powder is filtered off, dried and processed into hard materials as described above. The Co content can, as described above, be varied within 5–7% for WC+Co products obtained from the green powder. WC+Co products formed from the pink powder can be made with Co contents of about 1–25%, preferably 3–15%, by choosing initial amounts of W and Co salts.

In a third embodiment, ammonium metatungstate is dissolved in water. The concentration is typically within about 0.03 to 1.2 kg/l. The solution is heated to a temperature from 70° C. to the boiling point of the solution. The pH is adjusted to around neutral (6–8) by the addition of ammonium hydroxide. A soluble cobalt salt is added before or after the neutralization step depending on which product is desired. Addition of cobalt before the neutralization will promote the formation of the green colored powder. Addition of cobalt after the neutralization will, on the other hand, result in a higher yield of the pink colored powder. The reaction time after the cobalt addition is 10 minutes to 2 hours. The green powder is obtained by the addition of ammonium acetate followed by a cooling step, as in the first embodiment. The other product, the less soluble pink powder, precipitates without extra ammonium additions or cooling steps. The powders are filtered off, dried and processed into hard materials as described above. The Co content in WC+Co products made from powders is controlled and varied as described in the first and second embodiments.

In a fourth embodiment, ammonium metatungstate is reacted with a basic insoluble salt as $Co(OH)_2$, $CoCO_3$, $COC_2O_4$ or $CoCl(OH)$. The pink powder precipitates during the reaction. The green powder can be obtained through addition of ammonium ions.

In a fifth embodiment, the solvent is a mixed solvent, e.g., water/acetonitrile or water/ethanol but the reactions are otherwise the same as above in any of the first to fourth embodiments.

The method can also be applied to the corresponding nickel salts or combinations of cobalt and nickel salts.

Compounds like oxides, hydroxides, soluble or insoluble salts of other transition metals, such as V, Cr and/or Mo may also be added to the reaction mixture, together with the tungsten and cobalt salt or towards the end of the reaction.

The homogeneous fine W+Co metal powder according to the presently claimed invention can also be used in other applications like materials for catalysts or in materials for alloys of high density.

The invention is additionally illustrated in connection with the following Examples which are to be considered as illustrative of the present invention. It should be understood, however, that the invention is not limited to the specific details of the Examples.

EXAMPLE 1

2.7 liter sodium tungstate solution, with a concentration of 1.5 mole W/l, was stirred and heated to 90° C. 211 ml concentrated acetic acid was added, and thereafter, 1095 ml cobalt acetate solution with a concentration of 0.74 mole/l. The mixed solution was left to react at 90° C. for 1 hour. The color of the solution changed from pink to green during the reaction. 940 g ammonium acetate was dissolved in 225 ml water under heating. The ammonium acetate solution was added to the green cobalt tungstate solution. The solution was cooled to 16° C. with water and a green powder precipitated. The powder was purified once in a recrystallization step. To reduce the sodium content, the powder was dissolved in water at 90° C., and precipitated again by the addition of ammonium acetate followed by cooling. The composition after recrystallization was 61.6% W, 3.90% Co and 0.4% Na.

EXAMPLE 2

1.5 liter sodium tungstate solution with a concentration of 0.5 mole/l followed by 2 l water was pumped through two ammonium loaded cation columns in series. The pH of the outflow was about 9–10. The collected solution contained 0.4 mole W/l, but no sodium. 1650 ml of the tungstate solution was heated to 90° C. under stirring. The pH was after 30 minutes at 90° C. adjusted to 6–7 by the addition of 43 ml concentrated acetic acid. 29 g cobalt acetate (0.12 mole Co) was dissolved in 100 ml warm water and added to the solution in small batches during 5 minutes. The color was first pink and then after a few minutes dark green-grey. A pink cobalt tungsten containing powder was filtered off and dried. The solution was heated again to 90° C. 470 g ammonium acetate dissolved in 100 ml warm water was added to the solution which was then cooled with water to about 15° C. A green powder was formed, filtered off and dried. The yields were 142 g of the pink powder and 28 g of the green powder.

EXAMPLE 3

1.5 liter sodium tungstate solution with a concentration of 0.5 mole/l followed by 2 l water was pumped through two ammonium loaded cation columns in series. The pH of the outflow was about 9–10. The collected solution contained 0.4 mole W/l, but no sodium. 1650 ml of the tungstate solution was heated to 90° C. under stirring. 30 g cobalt acetate was dissolved in 100 ml warm water and added to the solution in small batches during 5 minutes. The pH was adjusted to 6–7 by the addition of 40 ml concentrated acetic acid. A pink cobalt tungsten containing powder was filtered off and dried. The solution was heated again to 90° C. 470 g ammonium acetate dissolved in 100 ml warm water was added to the solution which was then cooled with water to 15° C. A green powder was formed, filtered off and dried. The yields were 49 g of the pink powder and 123 g of the green powder.

EXAMPLE 4

3 liter ammonium metatungstate with a concentration of 2.4 mole W/l was stirred and heated to 100° C. 1.81 l cobalt acetate solution with a concentration of 0.7 mole Co/l was added during 20 minutes from a dropping funnel. 332 ml concentrated (25%) ammonium hydroxide solution was added with a pump during 2.5 hours. A pink precipitate appeared. The reaction mixture was boiled for another 25 minutes and then filtered to remove the pink powder. The solution, now intensively green, was heated to 90° C. 1430 g ammonium acetate dissolved in 0.2 l hot water was added under stirring. The reactor was cooled with water during 2 hours to a final temperature of 13° C. A green powder was formed, filtered off and washed with 2×250 ml ethanol to remove water and excess of ammonium acetate. The green powder was left to dry at room temperature. The yields were 68% for the green powder and 27% for the pink powder. The green powder containing 3.8% Co and 64% W was reduced and carburized to a WC—Co powder.

EXAMPLE 5

A solution of ammonium metatungstate (AMT) was prepared by dissolving 398 g AMT in 2 l water. 1.5 l of the AMT solution was heated to 100° C. 25 ml concentrated (25%) ammonium hydroxide solution was added slowly during 1 hour. 250 ml cobalt acetate solution, with a concentration of 0.76 mole Co/l, was added during 1 hour. The solution was boiled for 1 hour. A pink powder was filtered off. The solution was heated again before addition of 371 g ammonium acetate dissolved in 100 ml hot water. The solution was cooled with water to 20° C. to precipitate the green powder. The powder was filtered off and dried. The yields were 126 g of the pink powder and 98 g of the green powder.

EXAMPLE 6

3 liter ammonium metatungstate with a concentration of 2.4 mole W/l was stirred and heated to 100° C. 1.78 l cobalt acetate solution with a concentration of 0.7 mole Co/l was added during 20 minutes from a dropping funnel. Concentrated (25%) ammonium hydroxide solution (330 ml) was added with a pump during 2 hours. A pink precipitate appeared. The reaction mixture was boiled for another 15 minutes and then filtered to remove the pink precipitate. The solution, now intensively green, was heated to 90° C. 12.3 g ammonium vanadate was added and dissolved in the solution. 1430 g ammonium acetate dissolved in 0.2 l hot water was added under stirring. The reactor was cooled with water during 3 hours to a final temperature of 14° C. A green powder was formed, filtered off and washed with 2×250 ml ethanol to remove water and excess of ammonium acetate. The powder was left to dry at room temperature. The yields were 1403 g for the green powder and 493 g for the pink powder.

EXAMPLE 7

A solution of ammonium metatungstate (AMT) was prepared by dissolving 397 g AMT in 2 l water. 1.5 l of the AMT solution was heated to 100° C. 25 ml concentrated (25%) ammonium hydroxide solution was added slowly during 1 hour. 250 ml cobalt acetate solution, with a concentration of 0.73 mole Co/l, was added during 1 hour. $Cr(ClO_4)_3 6H_2O$ (6 g) was added to the solution. The solution was boiled for 1 hour. A pink powder was filtered off and dried. The solution was heated again before addition of 370 g ammonium acetate dissolved in 100 ml hot water. The solution was cooled with water to 20° C. to precipitate the green powder. The powder was filtered off and dried. The yields were 119 g of the pink powder and 102 g of the green powder.

EXAMPLE 8

A solution of ammonium metatungstate (AMT) was prepared by dissolving 401 g AMT in 2 l water. 1.5 l of the AMT solution was heated to 100° C. 11.2 g cobalt hydroxide was added to the tungstate solution. The solution was boiled for 2.5 hours. A pink/brown powder was formed, filtered off and dried. The solution was heated again before addition of 371 g ammonium acetate dissolved in 100 ml hot water. The solution was cooled with water to 20° C. to precipitate the green powder. The powder was filtered off and dried. The yields were 106 g of the pink/brown powder and 95 g of the green powder.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of preparing a powder containing tungsten and cobalt and/or nickel comprising mixing an aqueous solution of sodium tungstate, and a cobalt and/or nickel salt, adding ammonium acetate to the solution, reacting the mixture at a temperature of from about 70° C. to the boiling point of the solution, cooling the solution whereby a fine green powder, containing ammonium salts of W+Co(Ni) complex ions, precipitates on cooling and removing the precipitate from the solution.

2. The method of claim 1 wherein said green powder is further purified in a recrystallization step.

3. The method of claim 1 further comprising converting said sodium tungstate to ammonium tungstate by an ion exchange step prior to the addition of said salt, after which said ammonium acetate is added.

4. The method of claim 1 wherein said Co salt is a basic insoluble salt.

5. The method of claim 1 further comprising filtering said precipitated powders containing ammonium salts of W+Co (Ni) complex ions, drying and reducing them to a metallic powder and carburizing said metallic power to form a powder containing WC, Co and/or Ni.

6. The method of claim 1 further comprising adding Cr and/or V in the reacting step.

* * * * *